United States Patent

De Jager

[15] 3,649,914

[45] Mar. 14, 1972

[54] SUPPRESSED CARRIER ORTHOGONAL MODULATION TRANSMISSION DEVICE AND ASSOCIATED TRANSMITTERS AND RECEIVERS FOR THE TRANSMISSION OF SYNCHRONOUS PULSE SIGNALS

[72] Inventor: Frank De Jager, Emmasingel, Eindhoven, Netherlands

[73] Assignee: U.S. Philips Corporation, New York, N.Y.

[22] Filed: Oct. 29, 1968

[21] Appl. No.: 771,462

[30] Foreign Application Priority Data

Nov. 14, 1967 Netherlands..........................6715479

[52] U.S. Cl. ..........................................................325/38 R

[51] Int. Cl...........................................................H04b 1/00

[58] Field of Search....................325/38, 42, 43, 49, 62, 321; 179/15 OR; 178/66, 67

[56] References Cited

UNITED STATES PATENTS

| | | | |
|---|---|---|---|
| 3,204,034 | 8/1965 | Ballard et al. | 179/15 OR |
| 3,263,185 | 7/1966 | Lendeu | 325/38 X |
| 3,311,442 | 3/1967 | De Jager et al. | 325/42 |
| 3,391,339 | 7/1968 | Lynch | 325/49 |

*Primary Examiner*—Richard Murray
*Attorney*—Frank R. Trifari

[57] ABSTRACT

A suppressed carrier pulse transmission system features the transmission of the information signals by orthogonal modulation about a central frequency section containing two pilot signals. Because of a selected relationship among the pilot, carrier, and pulse clock frequencies, the receiver features devices, such as mixers, filters, and multipliers, for recovering the carrier and clock frequencies from the pilot signals without frequency or phase distortion.

14 Claims, 3 Drawing Figures

Figure 1:
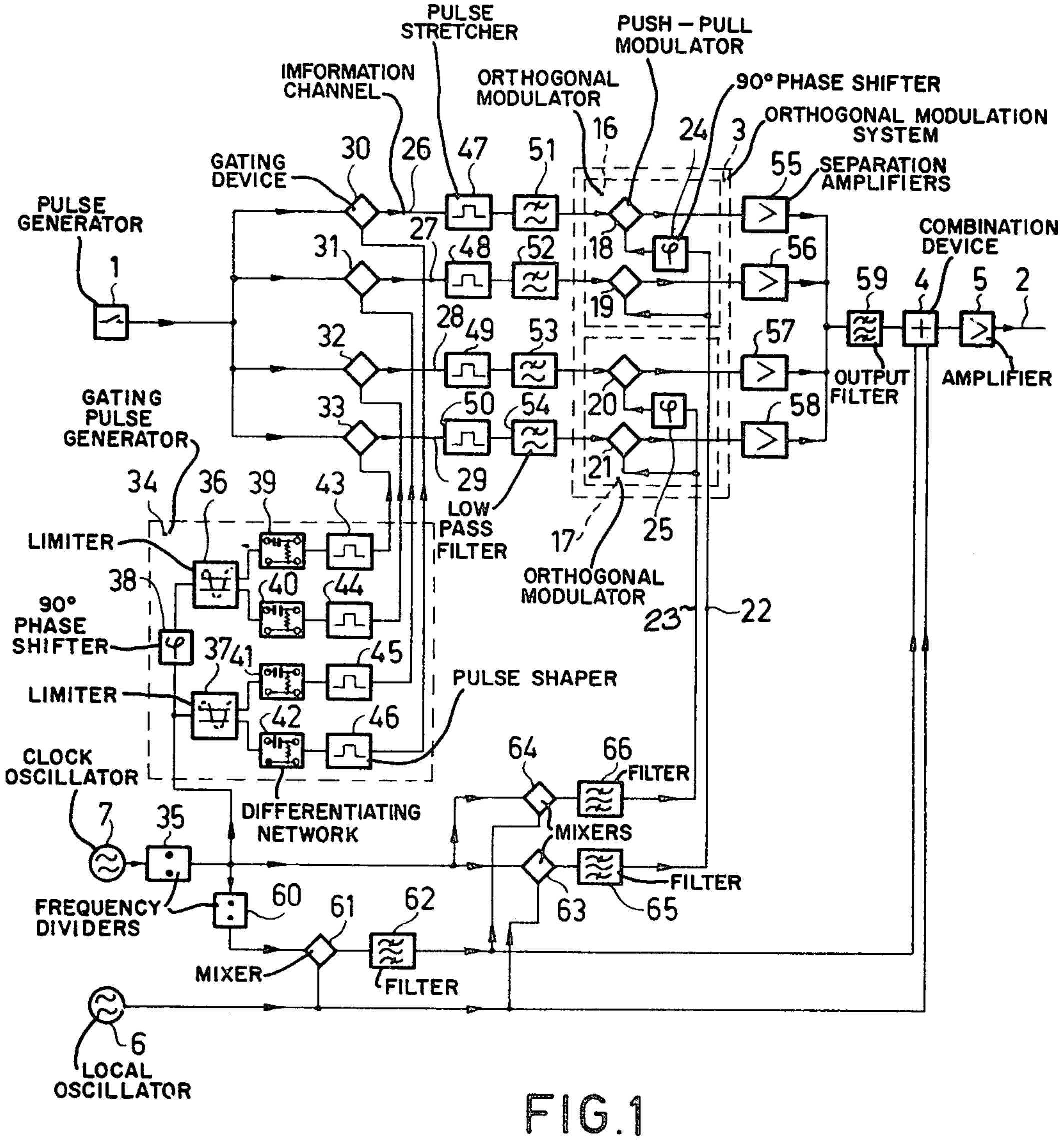

INVENTOR.
FRANK DE JAGER

BY

AGENT

INVENTOR.
FRANK DE JAGER

BY

Frank R. Jeifari
AGENT

SUPPRESSED CARRIER ORTHOGONAL MODULATION TRANSMISSION DEVICE AND ASSOCIATED TRANSMITTERS AND RECEIVERS FOR THE TRANSMISSION OF SYNCHRONOUS PULSE SIGNALS

The invention relates to a transmission device and associated transmitters and receivers for the transmission of synchronous pulse signals of a given clock frequency in a prescribed transmission band. The pulses at the transmitter end are transmitted by orthogonal modulation in an orthogonal modulation system and are demodulated at the receiver end in an orthogonal demodulation system and applied to a pulse regenerator system. Pilot signals are co-transmitted with the transmitted pulse signals and are selected at the receiver end in a selecting device for the purpose of recovering the carrier and the clock signal for demodulation and pulse regeneration. As is known in orthogonal modulation, the signal is transmitted on two carriers shifted 90° in phase, for example, a generally used orthogonal modulation device comprises two modulators which are supplied by carriers from a common carrier oscillator having a mutual phase shift of 90°, while the cooperating orthogonal demodulation device likewise uses two 90° phase-shifted local carrier oscillations which are applied to two synchronous demodulators.

A transmission device of the kind described which was used advantageously for synchronous pulse transmission in a speech band of 4 kc./s. has already been described in U.S. Pat. No. 3,311,442. In this known device, the DC current component of the pulse signals transmitted by orthogonal modulation is suppressed and is transmitted to the receiver together with a pilot signal of the carrier frequency, it being possible to cotransmit a second pilot signal for recovering the clock signal. After selection of these pilot signals at the receiver end, the local carrier oscillation and local clock oscillation are derived therefrom and applied to the orthogonal demodulator device for demodulation and to the pulse regenerator for pulse regeneration. As has been extensively described in the patent referred to, the very high information content of 4 kilobaud is transmitted in a speech channel of 4 kc./s. in a flexible transmission device of simple construction, which information content can even by increased to 4.5 kilobaud, if the phase equalization is performed carefully.

When using the described transmission device for synchronous pulse transmission in broad-frequency bands, for example, the basic group of a carrier telephony system of the 12-fold higher bandwidth of 48 kc./s. to transmit the 12-fold information content of 12×4=48 kilobaud, difficulties in the construction of the transmission device are found to occur in practice. At this high information speed, particularly strict requirements must be met by the phase equalization on the one hand, and the selection of the pilot signals (which causes difficulties), on the other hand. In addition, special steps must be taken for the transmission in existing carrier telephony systems of the pilot signals required in such carrier telephony systems.

It is the object of the invention to provide transmission devices and associated transmitters and receivers of the kind mentioned above for the transmission of high information content particularly in broad-frequency bands. Such devices furthermore are distinguished by simplicity of construction and flexibility of application, for example, this transmission device can directly be incorporated in existing carrier telephony systems and connected in a simple manner to pulse processing devices (computers). In addition, they are particularly suitable for the integrated circuit method of construction.

The transmission device according to the invention is characterized in that the orthogonal modulation system includes two orthogonal modulator devices which are fed by two carriers having frequencies located on either side of the central part of the transmission band. A frequency space is reserved in the central part of the transmission band for transmission of two pilot signals. The ratio between the clock frequency of the transmitted pulse series and the mutual frequency difference of the two pilot signals is an integer; and the ratio between the double frequency difference of each carrier including one of the pilot signals and the mutual frequency difference of the two pilot signals is also an integer. The orthogonal demodulation system includes two orthogonal demodulator devices and pulse regenerators connected thereto. Local carriers are applied to said orthogonal demodulator devices and local clock oscillations are applied to the associated pulse regenerators. The local oscillations are all derived from the two pilot signals selected in a selection device, which uses a mixer stage.

Figure 2:
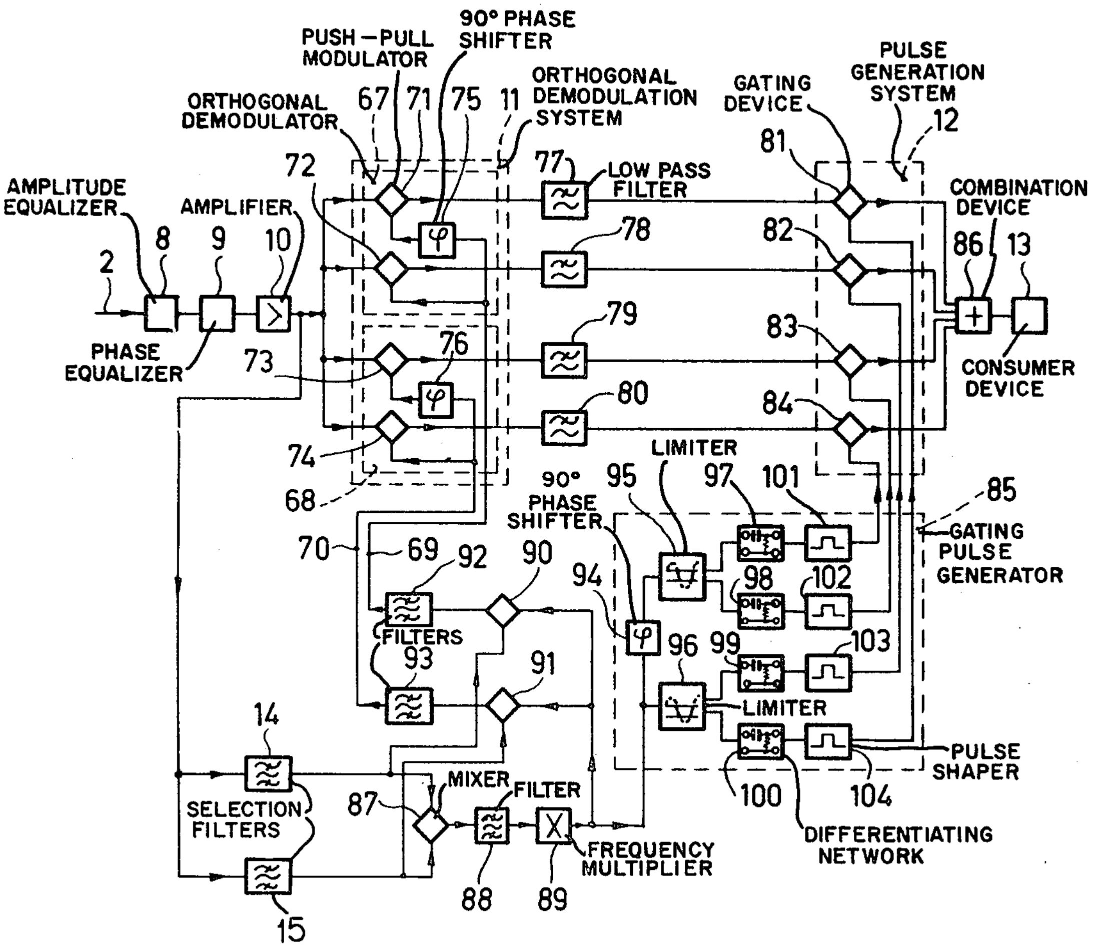
Figure 3:
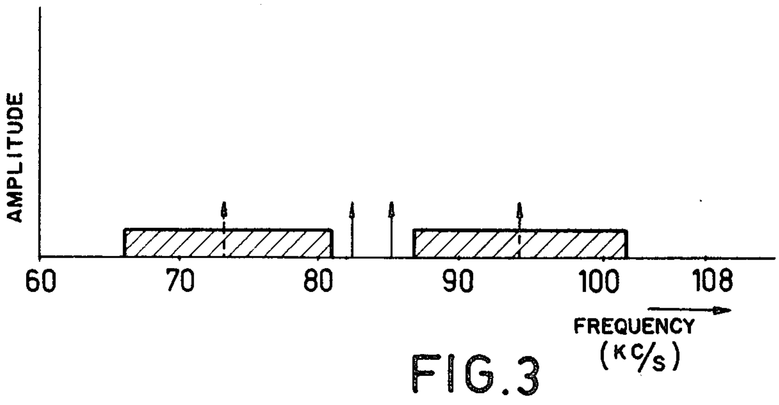

In order that the invention may be readily carried into effect, it will now be described in detail, by way of example, with reference to the accompanying diagrammatic drawings in which:

FIG. 1 and FIG. 2 show a transmitter and a receiver, respectively, according to the invention, while FIG. 3 shows a frequency spectrum to explain the operation of the transmitter and receiver shown in FIGS. 1 and 2.

The transmitter according to the invention shown in FIG. 1 is designed for transmission of synchronous pulse signals originating from a pulse generator 1 having a transmission speed of 48 kilobaud in a transmission line 2 in the frequency band of a basic group of 60–108 kc./s. of a carrier telephony system. For this purpose, the pulse signals from the pulse generator 1 are converted to the frequency band of 60–108 kc./s. by means of an orthogonal modulation system 3. After combination with pilot signals in a combination device 4, the pulse signals are transmitted through an output amplifier 5 to the receiver shown in FIG. 2. Pilot signals are derived from a local oscillator 6 and a clock frequency oscillator 7 of the synchronous pulse signals.

In the cooperating receiver of FIG. 2 the pulse signals transmitted by orthogonal modulation are applied through amplitude and phase equalization networks 8, 9 and an amplifier 10 to an orthogonal demodulation system 11 succeeded by a pulse regeneration system 12 for pulse regeneration according to shape and instant of occurrence. The demodulated and regenerated synchronous pulse signals thus obtained are applied to a consumer device 13, for example, a registration device. For the purpose of recovering local carrier and clock signals for demodulation in the orthogonal demodulation system 11 and pulse regeneration in the pulse regeneration system 12, the cotransmitted pilot signals are selected in selection filters 14, 15.

In order to considerably simplify the construction of the equalization networks 8, 9 and the selection filters 14, 15 of the pilot signals in the described transmission device arranged for the transmission of the high transmission speed of 48 kilobaud in the frequency band of 60–108 kc./s., the orthogonal modulation system 3 at the transmitter end is composed of two orthogonal modulator devices 16, 17 which are each provided with two push-pull modulators 18, 19 and 20, 21, respectively, for example, in the shape of ring modulators. Two carriers having frequencies of, for example, 94.5 and 73.5 kc./s. are located on either side of the central part of the transmission band of 60–108 kc./s. and are applied through lines 22, 23 to the two orthogonal modulator devices 16, 17. Said carriers occur with a mutual phase shift of 90° at the two modulators 18, 19 and 20, 21, respectively, of the modulator devices 16 and 17, respectively, because of the interposition of 90° phase-shifting networks 24, 25. Pulses series derived from the pulse generator 1 are applied to the push-pull modulators 18, 19, 20, 21 through information channels 26, 27, 28, 29. For this purpose the pulses from the pulse generator 1, having a clock frequency of 48 kc./s., are distributed by means of a pulse commutator over the four information channels 26, 27, 28, 29 into four pulse series each having a clock frequency of 12 kc./s. The pulse commutator is provided with normally blocked gating devices 30, 31, 32, 33 located in the information channels 26, 27, 28, 29. The gating devices are released successively and periodically at a cycle frequency of 12 kc./s. by gating pulses from a gating pulse generator 34, which is synchronized in a frequency divider 35 by the clock frequency oscillator 7 of 48 kc./s. after frequency division by a factor of 4. In the described embodiment, the gating pulse generator 34 is formed by two balanced amplitude limiters 36, 37 of the push-pull type each having two output terminals which convey voltages of opposite polarities and the two amplitude limiters 36, 37 are fed directly and through a 90° phase-shifting network 38, respectively, by the output voltage of the frequency divider 35. For obtaining the gating pulses for the gating devices 30, 31, 32, 33, each output terminal on the amplitude limiters 36, 37 is succeeded by a differentiating network 39, 40, 41, 42 and a pulse shaper 43, 44, 45, 46, for example, consisting of a monostable relaxation generator.

In this manner, successive gating pulses for releasing the gating devices 30, 31, 32, 33 are generated by the pulse shapers 43, 44, 45, 46 during each period of the cycle frequency of 12 kc./s. of the gating pulse generator 34. Therefore, the successive pulses from the pulse generator 1 successively occur at the output circuits of the gating devices 30, 31, 32, 33, which pulses are applied for further handling to the information channels 26, 27, 28, 29. The information channels 26, 27, 28, 29 are provided with pulse wideners 47, 48, 49, 50 and low-pass filters 51, 52, 53, 54 having limit frequencies of 7.5 kc./s. for suppression of the spectrum components which are located slightly above half the pulse frequency of 12/2=6 kc./s. of the pulse series occurring in the information channels 26, 27, 28, 29.

As a result of the modulation process of these frequency spectra located in the band of 0–7.5 kc./s. including the carriers of 94.5 and 73.5 kc./s., the frequency bands of 87–102 kc./s. and of 66–81 kc./s. occur at the output circuits of the push-pull modulators 18, 19, 20, 21. These signals are applied for further transmission to the combination device 4 through separation amplifiers 55, 56, 57, 58 and a common output filter 59. Between the frequency bands of 87–102 kc./s. and of 66–81 kc./s. transmitted by the two orthogonal modulator devices 16, 17, a frequency space of 81–87 kc./s. is thus reserved in the central part of the transmission band of 60–108 kc./s. for the transmission of pilot signals of, for example, 82.5 and 85.5 kc./s. The pilot signals are transmitted through line 2 for recovering local carrier and clock signals at the receiver end.

The two pilot signals of 82.5 and 85.5 kc./s. and the two carriers of 94.5 and 73.5 kc./s. from the two orthogonal modulator devices 16, 17 are derived from the clock signal oscillator 7 of 48 kc./s. and from the oscillator 6 which has a fixed frequency. The oscillator 6 directly provides the pilot frequency of 82.5 kc./s., and the pilot frequency of 85.5 kc./s. is obtained by providing a further frequency divider 60 having a factor of 4 on the output circuit of the frequency divider 35 and by mixing the frequency of 3 kc./s. thus generated with the frequency of the oscillator 6 of 82.5 kc./s. in a mixer stage 61 including output filter 62. The two carrier frequencies of 94.5 kc./s. and 73.5 kc./s. are obtained from the pilot signals of 82.5 kc./s. and 85.5 kc./s. by mixing these signals in mixer stages 63 and 64 including output filters 65 and 66 with the frequency of 12 kc./s. of the divider stage 35.

It has thus been achieved that there is a fixed relationship between the two pilot signals of 82.5 kc./s. and 85.5 kc./s. on the one hand and the clock frequency of the pulse series of 12 kc./s. transmitted by the information channels 26,27, 28, 29 and the two carriers of 94.5 and 73.5 kc./s. on the other hand. In the embodiment described, the relationship is that first, the ratio of the clock frequency of the pulse series transmitted to the frequency difference between the two pilot signals is an integer, and second, the ratio of the frequency difference between each one of the carriers and either one of the pilot signals to the frequency difference between the two pilot signals is likewise an integer. In particular, for the embodiment described in which the clock frequency is 12 kc./s., and the frequency difference between the pilot signals is 3 kc./s., the first ratio is 12:3=4:1. Likewise, for the given values of the carrier frequencies, 94.5 kc./s. and 73.5 kc./s., both second ratios with regard to the pilot signal of 82.5 kc./s. are (94.5–82.5):3=12:3=4:1 and (82.5–73.5):3=9:3=3:1 respectively; the both second ratios with regard to the pilot signal of 85.5 kc./s. are (94.5–85.5) 3=9:3=3:1 and (85.5–73.5):3 =12:3=4:1. On account of the above relationship the two carriers of 94.5 kc./s. and 73.5 kc./s. and also the clock frequency of 12 kc./s. of the transmitted pulse series can unambiguously be recovered in the correct phase from the two pilot signals of 82.5 kc./s. and 85.5 kc./s. at the receiver end. The phase relationship is independent of frequency variations in the oscillators 6, 7.

For illustrative purposes the signals transmitted by the transmission device of FIG. 1, are shown by a frequency diagram in FIG. 3. In the transmission band 60–108 kc./s. the hatched parts situated in the frequency bands of 66–81 kc./s. and of 87–102 kc./s. show the frequency spectra of the pulse signals orthogonally modulated on the carrier frequencies of 73.5 and 94.5 kc./s. The broken line arrows indicate the carrier frequencies of 73.5 and 94.5 kc./s., and the solid-line arrows indicate the pilot signals of 82.5 and 85.5 kc./s., said pilot signals being located in the reserved frequency space of 81–87 kc./s. in the central part of the transmission band.

In the described device according to the invention a frequency space for the pulse transmission is reserved in the central part of the transmission band, and the transmission of the pulse information of 48 kilobaud is split-up over two orthogonal modulation devices 16,17 so that the requirements of the equalization, particularly of the phase equalization, are reduced in a progressive manner since the information speed of the transmitted pulse series is reduced by 50 percent due to this split-up. First, the construction of the equalization networks 8 and 9 at the receiver end is essentially simplified when transmitting the same pulse information of 48 kilobaud, second, a disturbing influence on the transmission of these signals by the transmission characteristics of the transmission line 2 is obviated due to reserving the central part of the transmission band for the two pilot signals. Due to a great elimination of the characteristics of the transmission line 2 a transmission device for synchronous pulse signals having a very great information speed in broad transmission bands has been obtained in this manner. The transmission device can be used to special advantage for pulse transmission in a basic group of existing carrier telephony systems since the pilot signals of, for example, 64.08; 84.08; 104.08 kc./s. required for such carrier telephony systems exactly fall within the reserved frequency spaces.

As a partical advantage of the transmitter shown in FIG. 1, it is to be noted that the bandwidths of the signal transmitted by the orthogonal modulator devices 16, 17 are determined by the low-pass filters 51, 52, 53, 54 included in the information channels 26, 27, 28, 29. In fact, clock-frequency variations do not substantially cause any phase variations in the transmitted pulse signals, and furthermore, the low-pass filters 51, 52, 53, 54 are particularly suitable to be constructed as digital filters, so that the transmission device shown can be integrated as much as possible in the solid state. The digital filter described in U.S. Pat. No. 3,500,215 can be advantageously used. This filter is provided with a shift register shifted at a multiple of the pulse frequency. To obtain the shift frequency, it is possible to directly take the frequency of the oscillator 7 of 48 kc./s.

In the cooperating receiver of FIG. 2, the incoming orthogonally modulated pulse signals are applied, after equalization in the networks 8, 9 and amplification in the amplifier 10, to the orthogonal demodulation system 11 which is formed by two orthogonal demodulator devices 67, 68, to which carriers of 94.5 and 73.5 kc./s. locally obtained from the cotransmitted pilot signals of 82.5 kc./s. and 85.5 kc./s. are applied through lines 69, 70. Each orthogonal demodulator device 67, 68 is composed of two push-pull modulators 71, 72 and 73, 74, respectively, in the form of ring modulators which are connected directly and with the interposition of 90° phase-shifting networks 75, 76 to the lines 69, 70 for demodulation of the received modulated pulse series. The demodulated series at the output of the push-pull modulators 71, 72, 73, 74 are applied to the pulse regenerator system 12 through low-pass filters 77, 78, 79, 80 of a limit frequency of, for example, 7.5 kc./s. for further handling in the consumer device 13. In this embodiment the pulse regenerator system 12 is formed by usually blocked gating devices 81, 82, 83, 84 connected to the output circuits of the low-pass filters 77, 78 79 80. The gating devices 81, 82, 83, 84 are released only upon simultaneously occurrence of a pulse at the outputs of the low-pass filters 77, 78, 79, 80 and a pulse having a clock frequency of 12 kc./s. of a gating pulse generator 85 to be described hereinafter. Thus pulses which are regenerated in accordance with shape and instant of occurrence are obtained at the outputs of gating devices 81, 82, 83, 84 and are applied to the consumer device 13 after combination in a combination device 86.

Both the two local carriers of 94.5 and 73.5 kc./s. and the clock frequency of the transmitted pulse series of 12 kc./s. are derived from the pilot signals selected in the selection filters 14, 15. A mixer stage 87 including an output filter 88 is used for generating the difference frequency of 3 kc./s. which provides the clock frequency of 12 kc./s. of the transmitted pulse series after frequency multiplication in a frequency multiplier 89 by a frequency multiplication factor of 4. The local carriers of 94.5 kc./s. and 73.5 kc./s. are recovered from the selected pilot signals of 82.5 kc./s. and 85.5 kc./s. and the recovered clock frequency of 12 kc./s. in exactly the same manner as already described for the transmission device of FIG. 1. In particular, the two local carriers of 94.5 and 73.5 kc./s. are obtained by mixing the selected pilot signals of 82.5 kc./s. and 85.5 kc./s. in a mixer stages 90, 91 with the clock frequency of 12 kc./s. and then filtering using output filters 92,93. The gating pulse generator 85 is also constructed similarly as the gating pulse generator 34 at the transmitter end, namely the clock frequency of 12 kc./s. is applied directly on the one hand and through a 90° phase-shifting network 94 on the other hand to the limiters of the push-pull type 95, 96 each having two output terminals which convey voltages of opposite polarities. The output terminals are followed by the cascade circuit of differentiating networks 97, 98, 99, 100 and pulse shapers 101, 102, 103, 104, for example, a monostable relaxation generator. Gating pulses of 12 kc./s. which are applied to the gating device 81, 82, 83, 84 successively appear at the pulse shapers 101, 102, 103, 104 of the gating pulse generator 85.

Due to the fixed relationship between the pilot signals on the one hand and the two carriers as well as the clock frequency of the transmitted pulse signals on the other hand, it is ensured that the two carriers and the clock frequency are unambiguously recovered in phase from the two pilot signals. Due to the frequency location of the pilot signals in the central part of the transmission band undesirable phase influences of the carriers and clock frequency recovered from the pilot signals are substantially eliminated by the transmission line 2. Both advantages, which are a result of the rigid coupling between the two orthogonal divider systems of the orthogonal transmission system, are very difficult to obtain at the same time in a different manner, for example, when using a single orthogonal system or when using two independent orthogonal systems.

The selection of the pilot signals is very simple due to the great distance between the frequencies and between the frequency spectra of the transmitted pulse signals, as is shown in FIG. 2. For the selection, use may advantageously, be made of an AFC device provided with a local oscillator which is stabilized in phase by the received pilot signal with the aid of a phase detector, or by the device as described in U.S. Pat. No. 3,505,607.

Together with the advantages already mentioned of the transmission device described so far, namely a great independence of the transmission characteristics of the transmission line at a high pulse information, its realization is interesting from a technical point of view because it can be done in a simple and noncritical construction. The transmission device is composed of a large number of elements of mutually identical construction, for example, four identical transmitting channels and receiving channels, identical carrier generating equipment at the transmitter and receiver ends, identical gating pulse generators at the transmitter end and the receiver end. In its possibilities of application, the transmission device shown is particularly flexible, for example, apart from the application already mentioned this transmission device can also be connected in a simple manner to pulse-processing devices (computers). In fact, instead of the transmission of the pulses from one pulse generator, the pulses of four mutually independent pulse generators each having a transmission speed of 12 kilobaud can also be transmitted in the four information channels. It is possible to increase said number of pulse generators by a factor of two so that for each information channel the pulse of two independent pulse generators can be transmitted by using a four-level code. Thus, eight pulse series in a parallel arrangement of 12 kilobaud each are available at the receiver end. These series can directly be utilized as a supply for a conventional computer without using an additional series parallel converter with associated word synchronization.

It should be noted that in the embodiment described the ratio of the frequency difference between each one of the carriers and either one of the pilot signals to the frequency difference between the two pilot signals is an integer. Within the scope of the present invention, however, this ratio may alternatively be equal to an odd multiple of one-half, for example, 5/2, 7/2, 9/2 etc. In that case, the two carriers at the receiver end are not derived from the pilot signals in unambiguous phase, since a phase ambiguity of 180° resulting from the frequency division by a factor two may occur. The trouble of this phase ambiguity may, however, be avoided in a simple manner by supplying the pulses from pulse generator 1 at the transmitter end through a code converter in the form of a change-of-state modulator to the information channels 26–29.

Within the scope of the invention it generally holds that the ratio of twice the frequency difference between each one of the carriers and either one of the pilot signals to the frequency difference between the pilot signals is an integer.

What is claimed is:

1. A transmitter for the transmission of pulse signals of a given clock frequency within a selected frequency band, comprising first and second orthogonal modulators coupled to receive said pulse signals, first and second sources of carrier signals coupled to said first and second modulators respectively and having frequencies on either side of the center frequency of said frequency band thereby reserving a central sector of said band, a source of first and second pilot signals each having a frequency within said central sector, means for adding said pilot signals to the outputs of said modulators, the ratio of said clock frequency to the frequency difference between said pilot signals being an integer, (the ratio of twice the frequency difference between one of said carriers and one of said pilot signals to the frequency difference between said pilot signals being an integer and the ratio of twice the frequency difference between the remaining carrier and said same pilot signal to the frequency difference between said pilot signals being an integer.

2. A transmitter as claimed in claim 1 further comprising a fixed frequency oscillator means coupled to said sources of carrier and pilot signals for deriving said signals from said clock frequency.

3. A transmitter as claimed in claim 2 wherein said oscillator frequency equals one of said pilot frequencies.

4. A transmitter as claimed in claim 3 further comprising a frequency divider coupled to receive said clock frequency, means for generating said remaining pilot frequency including a mixer coupled to said divider and to said oscillator, and a filter coupled to said mixer.

5. A transmitter as claimed in claim 1 wherein said sources of first and second carrier signals each comprise a mixer coupled to receive said clock signals respectively and said pilot signals respectively, and a filter coupled to said mixers respectively.

6. A transmitter as claimed in claim 1 further comprising a commutator coupled to receive said pulse signals and having four output channels, and wherein said orthogonal modulation devices each comprise two push-pull modulators having inputs coupled to said commutator outputs respectively.

7. A transmitter as claimed in claim 6 wherein said commutator comprises a plurality of gates and further comprising a gating pulse generator coupled to said gates.

8. A transmitter as claimed in claim 7 wherein said gating pulse generator comprises two push-pull balanced limiters each providing two output signals of opposite phase, means for applying said clock frequency signal to said gates with a 90° phase difference therebetween, and four pulse sharpeners coupled to the outputs of said limiters respectively.

9. A receiver for the reception of pulse signals of a given clock frequency within a selected frequency band modulated upon first and second suppressed carrier signals having frequencies on either side of the center frequency of said frequency band thereby reserving a central sector of said band, said receiver comprising first and second orthogonal demodulators coupled to receive said pulse signals, means for selecting first and second pilot signals each having a frequency within said central sector, means for recovering said carrier signals from said selected pilot signals coupled to said demodulators, the ratio of said clock frequency to the frequency difference between said pilot signals being an integer, the ratio of twice the frequency difference between the remaining carrier and said same pilot signal to the frequency difference between said pilot signals being an integer, a plurality of pulse regenerators coupled to the outputs of said demodulators, and clock mixer means for recovering said clock frequency from said selected pilot signals coupled to said regenerators.

10. A receiver as claimed in claim 9 wherein said clock recovering means comprises a frequency multiplier coupled to said mixer means.

11. A receiver as claimed in claim 9 wherein said carrier recovering means comprises two carrier mixers coupled to said pilot signal selecting means respectively and to said clock mixer means, and two filters coupled to said carrier mixers respectively and to said orthogonal demodulators respectively.

12. A receiver as claimed in claim 9 wherein said orthogonal demodulators each comprise two push-pull demodulators coupled to said regenerators respectively, said regenerators each comprising a gate, and further comprising a gating pulse generator coupled between said gates and said clock recovering means.

13. A transmitter as claimed in claim 12 wherein said gating pulse generator comprises two push-pull balanced limiters each providing two output signals of opposite phase, means for applying said clock frequency signal to said gates with a 90° phase difference therebetween, and four pulse sharpeners coupled to the outputs of said limiters respectively.

14. A transmission system for the transmission of pulse signals of a given clock frequency within a selected frequency band, comprising a transmitter, a receiver, a transmission link coupling said transmitter and said receiver, said transmitter comprising first and second orthogonal modulators coupled to receive said pulse signals, first and second sources of carrier signals coupled to said first and second modulators respectively and having frequencies on either side of the center frequency band thereby reserving a central sector of said band, a source of first and second pilot signals each having a frequency within said central sector, means for adding said pilot signals to the outputs of said modulators, the ratio of said clock frequency to the frequency difference between said pilot signals being an integer, the ratio of twice the frequency difference between one of said carriers and one of said pilot signals to the frequency difference between said pilot signals being an integer, the ratio of twice the frequency difference between the remaining carrier and said same pilot signal to the frequency difference between said pilot signals being an integer, said receiver comprising first and second orthogonal demodulators coupled to said transmission link to receive said pulse signals, means for selecting said first and second pilot signals, means for recovering said carrier signals from said selected pilot signals coupled to said demodulators, a plurality of pulse regenerators coupled to the outputs of said demodulators, and clock mixer means for recovering said clock frequency from said selected pilot signals coupled to said regenerators.

* * * * *

PO-1050
(5/69)

UNITED STATES PATENT OFFICE
CERTIFICATE OF CORRECTION

Patent No. 3649914 Dated March 14, 1972

Inventor(s) FRANK DE JAGER

It is certified that error appears in the above-identified patent and that said Letters Patent are hereby corrected as shown below:

In the title page, after [54], the title should read

-- SUPPRESSED CARRIER ORTHOGONAL MODULATION PULSE TRANSMISSION SYSTEM WITH PILOT SIGNALS FOR RECOVERING THE CARRIERS AND CLOCK FREQUENCIES --;

Col. 2, line 17, after "spectrum" insert -- diagram --.

Claim 9, line 13, "between the" should read -- between one of said carriers --;

line 14, cancel in its entirety and rewrite as follows: -- and one of said pilot signals to the frequency --;

line 15, after "integer," insert -- the ratio of twice the frequency difference between the remaining carrier and said same pilot signal to the frequency difference between said pilot signals being an integer, --.

Claim 14, line 9, before "band" (first occurence) insert -- of said frequency --.

Col. 1, lines 1-4, cancel in its entirety and rewrite the the title as shown above.

Signed and sealed this 31st day of October 1972.

(SEAL)
Attest:

EDWARD M.FLETCHER,JR.
Attesting Officer

ROBERT GOTTSCHALK
Commissioner of Patents